United States Patent [19]

Galloway

[11] Patent Number: 4,511,155
[45] Date of Patent: Apr. 16, 1985

[54] ONE WHEEL TRAILER FOR A TWO-WHEELED VEHICLE

[75] Inventor: Donald Galloway, Bradenton, Fla.
[73] Assignee: Verl Fielding, Palmetto, Fla.
[21] Appl. No.: 478,900
[22] Filed: Mar. 25, 1983
[51] Int. Cl.³ ............................................. B62D 63/06
[52] U.S. Cl. ................................... 280/204; 188/279; 188/298; 224/32 R; 224/42.43; 280/495; 280/656; 296/27; 312/284; 312/321
[58] Field of Search ............... 280/204, 205, 272, 442, 280/446 B, 460 R, 495, 496, 498, 656, 78, 772, 773, 92, 96.3, 722, 63; 188/279, 298; 244/100, 109; 296/35.3, 37.3, 27, 26; 224/32 R, 42, 43; 312/284, 321

[56] References Cited

U.S. PATENT DOCUMENTS

| | | | |
|---|---|---|---|
| 3,387,859 | 6/1968 | McClellan | 280/204 |
| 3,784,230 | 1/1974 | Worrall, Jr. | 280/78 X |
| 4,005,873 | 2/1977 | Jacobsen et al. | 280/63 |
| 4,027,899 | 6/1977 | Hawes et al. | 280/204 X |
| 4,066,156 | 1/1978 | Basile | 280/47.26 X |

FOREIGN PATENT DOCUMENTS 1091332 10/1954 France ................................. 280/204

Primary Examiner—Joseph F. Peters, Jr.
Assistant Examiner—Mitchell J. Hill
Attorney, Agent, or Firm—Frijouf, Rust & Pyle

[57] ABSTRACT

A one wheel trailer for a two-wheeled vehicle such as a motorcycle, or the like, is disclosed. The trailer includes a first and a second arm, each arm having a first and a second end. The first end of each arm is connected preferably to the site corresponding to a passenger footpeg of the two wheeled vehicle or the like. A rigid frame is secured adjacent the second end of each arm. A container is secured to the bulkhead and a spring biased suspension arm is pivotally connected to the bulkhead. A castor arm is mounted adjacent the distal end of the suspension arm enabling swivelling of the castor arm relative to the suspension arm. A wheel is rotatably mounted relative to the castor arm permitting the wheel to support the container.

20 Claims, 24 Drawing Figures

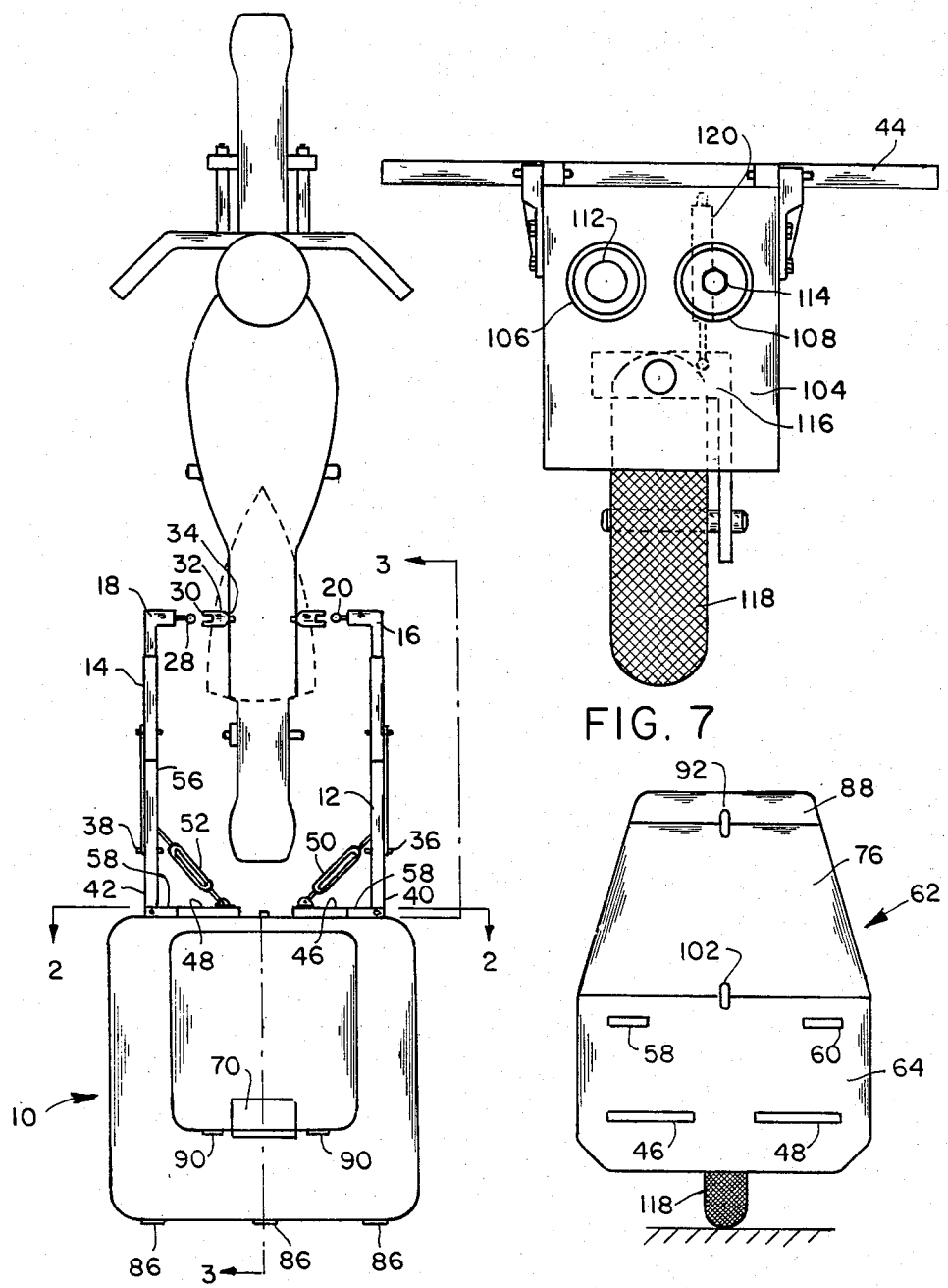

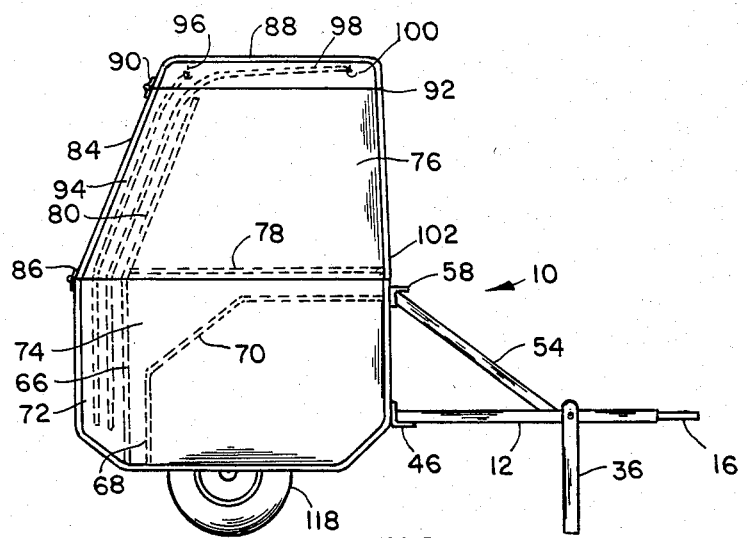
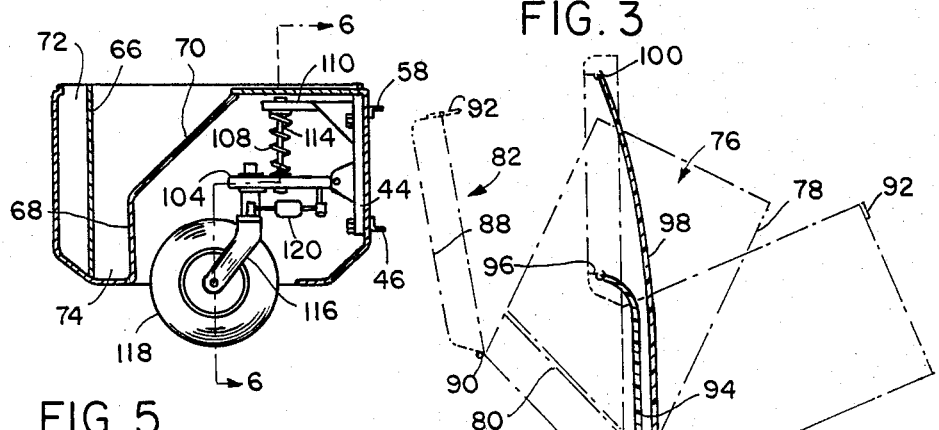
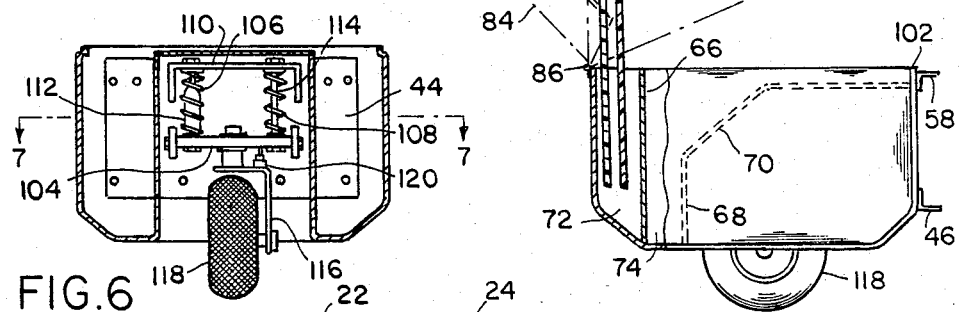
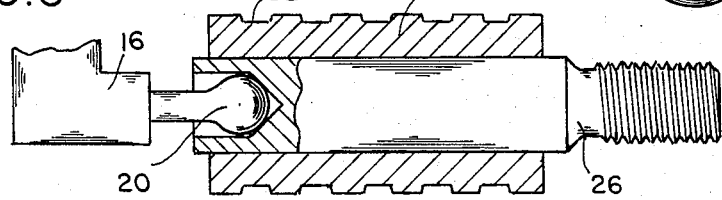

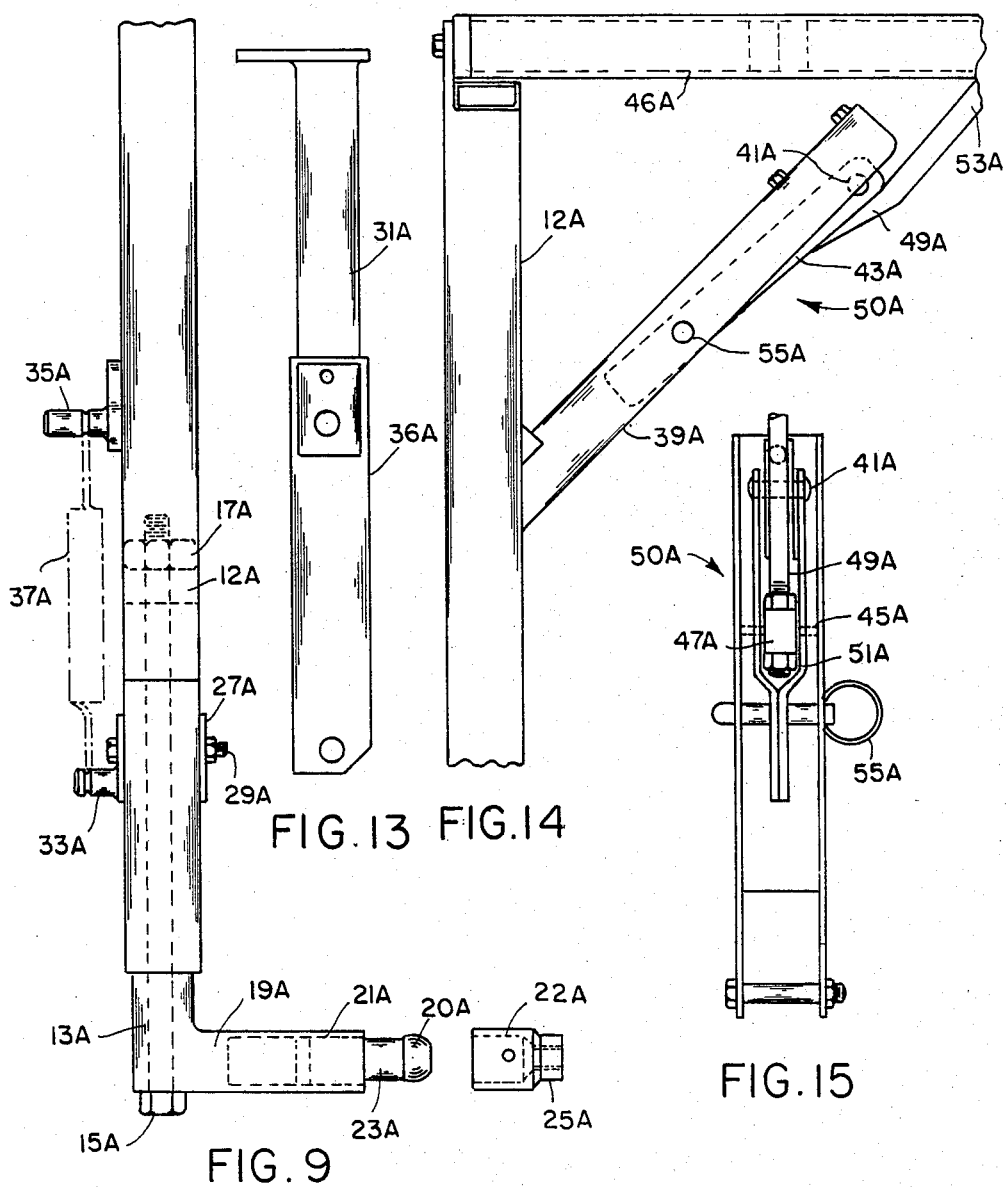

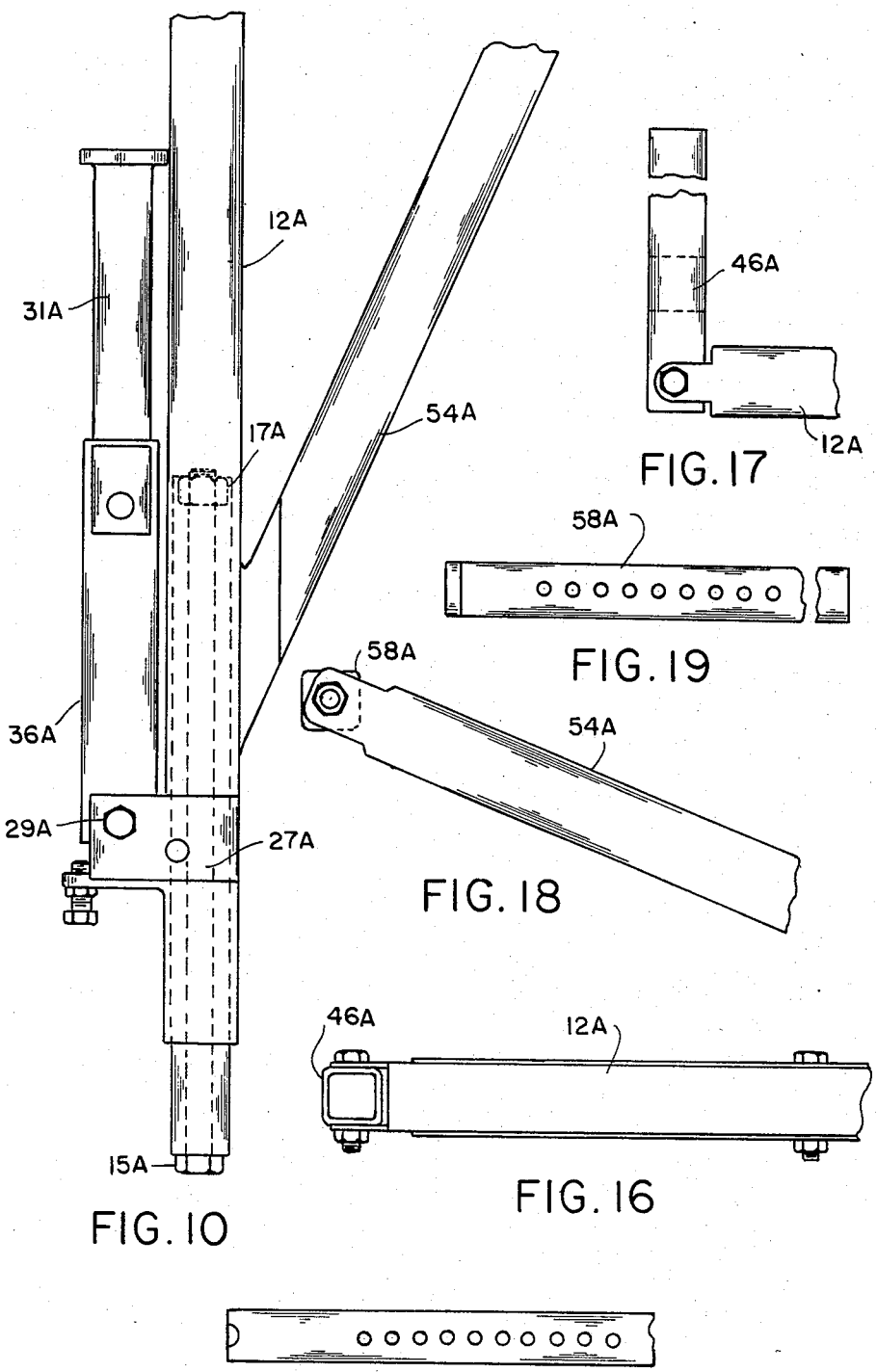

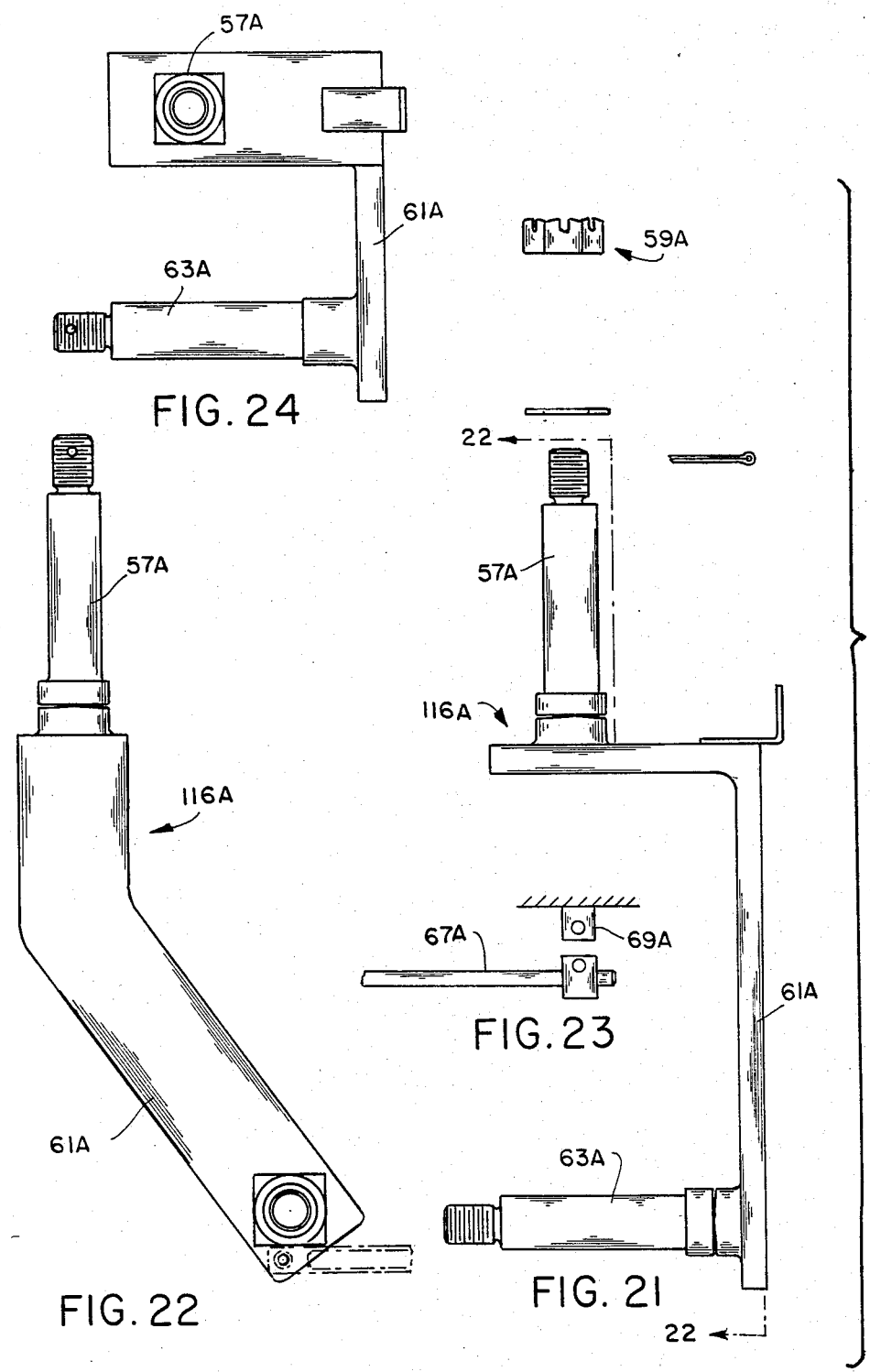

ONE WHEEL TRAILER FOR A TWO-WHEELED VEHICLE

BACKGROUND OF THE INVENTION

1. Field of the Invention

This invention relates to one wheel trailers for bicycles and more particularly to one wheel trailers for connection to the passenger footpegs of motorcycles and the like.

2. Description of the Prior Art

During the 1970's, the sale of motorcycles rapidly increased due in part to the ever escalating cost of petroleum fuels. Such increased fuel costs have forced many automobile owners to turn to the alternative two wheeled means of transportation.

While many cost related problems are overcome by resorting to the economical transportation afforded by the motorcycle, such motorcycles have suffered from certain difficulties with regard to luggage carrying capabilities.

Motorcycles are extensively used for vacations and towing generally, in which case a luggage carrying capability is essential. Camping equipment, including tents, sleeping bags and cooling utensils are particularly bulky and several box-like containers and saddlebags have been designed in an attempt to accommodate the needs of such motorcyclists. However, the prior art saddlebags and luggage carrying devices, because of their inherent bulk and weight, tend to have an adverse effect upon the handling characteristics of the motorcycle. These adverse characteristics are particularly noticeable when the motorcycle is rapidly retarded or when a tire is punctured.

More recently, motorcycle trailers have been developed including a pair of ground engaging wheels. This type of trailer overcomes the aforementioned problems associated with storage of luggage and can provide a lockable storage container for relatively bulky camping gear, tents, cooking utensils, sleeping bags, clothing, tools and luggage.

However, with the provision of a two-wheeled trailer, towing problems have been experienced because as the motorcycle leans over while going around a bend in the road, the trailer will remain in the upright disposition. Such disposition of the trailer relative to the motorcycle results in poor cornering characteristics and also requires a relatively complex universal coupling arrangement between the trailer and the frame of the motorcycle.

U.S. Pat. No. 3,387,859 to McClellen discloses a one wheel trailer for a motorcycle. The McClellen patent teaches a means for ready disconnection of a one wheel trailer to a motorcycle. However, the brackets of the trailer are connected to the swing arm of the motorcycle rather than the frame. This point of attachment is inaccessible on many motorcycles due to the location of exhaust systems and various other brackets.

The one wheel trailer of the present invention overcomes the aforementioned inadequacies of the prior art devices by providing a trailer which has improved cornering characteristics and can be attached or detached from a motorcycle or the like in a simple manner without interfering with other attachments disposed on the motorcycle. It is the primary objective of the present invention to provide a one wheel trailer for bicycles, motorcycles or the like that has a relatively large storage capacity for the storage of camping gear, tents, cooking utensils, sleeping bags, waterproof clothing and luggage.

Another object of the present invention is the provision of a trailer for a two-wheeled vehicle that will not interfere with the ease with which the cyclist is able to mount the machine.

Another object of the present invention is the provision of a one wheel trailer for a motorcycle in which the trailer has a relatively low center of gravity.

Another object of the present invention is the provision of a one wheel trailer for a motorcycle in which the trailer includes a pair of arms which are connected to the site of the passenger footpegs of the motorcycle.

Another object of the present invention is the provision of a one wheel trailer for a motorcycle in which an adapter is secured to the site of the passenger foot peg, the adapter being selectively connectible to either the passenger footpeg or the ball fitment of the trailer arm.

Another object of the present invention is the provision of means for adjusting the disposition of the trailer arms and additional supports relative to the container and to a ball and socket connection between the trailer motorcycle to accommodate minor misalignments between the motorcycle and the trailer arms.

Another object of the present invention is the provision of a ride-off stand associated with each of the trailer arms to provide a support to the motorcycle and trailer combination when parked.

Another object of the present invention is the provision of a one-wheel trailer having the same or less width than the width of the associated motorcycle.

Another object of the present invention is the provision of a one-wheel trailer, the wheel of which will follow the same path as the wheels of the associated motorcycle.

Another object of the present invention is the provision of an adjustable means for adjusting the disposition of the trailer arms relative to the motorcycle enabling rapid connection of the trailer to the motorcycle and disconnection of the same.

Another object of the present invention is the provision of a one wheel trailer for a motorcycle in which the wheel is rotatably mounted adjacent a castor arm which is secured to a suspension arm for swivelling relatively thereto.

Another object of the invention is the provision of a spring and a shock absorber which reacts between the container and suspension arm.

Another object of the present invention is the provision of a preload bolt which extends between the suspension arm and a spring mounting plate, the preload bolt enabling adjustment of the suspension arm in accordance with the weight of the contents of the containers.

Another object of the invention is the provision of an access lid in the container enabling access to the trailer suspension.

Another object of the present invention is the provision of locking means to lock the castor arm relative the suspension arm enabling rearward maneuvering of the motorcycle and trailer combination.

The foregoing has outlined some of the more pertinent objects of the present invention. These objects should be construed to be merely illustrative of some of the more pertinent features and applications of the invention. Many other beneficial results can be attained by applying the disclosed invention in a different manner or modifying the invention within the scope of the disclosure. Particularly, with regard to the use of the invention disclosed herein, this should not be construed as limited to one wheel trailers for bicycles or motorcycles, but should include one wheel trailers and load carrying devices for cars, tricycles, invalid carriages, golf carts and the like.

SUMMARY OF THE INVENTION

The one wheel trailer of the present invention is defined by the appended claims with a specific embodiment shown in the attached drawings. For the purpose of summarizing the invention, the invention relates to a one wheel trailer for a motorcycle or the like. The one wheel trailer includes a first and a second arm, each arm having a first and a second end. The first ends of the arms are connected to opposite sides of the bicycle. A bulkhead is rigidly secured adjacent the second ends of the arms and a container is disposed adjacent the bulkhead. A biased suspension arm is pivotally connected to the bulkhead and a castor arm is mounted at the distal end of the suspension arm such that the castor arm is free to swivel relative to the suspension arm. A wheel is rotatably mounted relative to the castor arm enabling the wheel to support the container.

In a more specific embodiment of the invention, the arms are connected to the site of corresponding passenger footpegs of the motorcycle by means of a ball disposed at the first end of each arm, the ball cooperating with a socket defined by the distal end of each adapter secured at the site of each of the footpegs. Each of the arms also includes a stowable stand and means for adjusting the disposition of each of the first ends of the arms relative to the adapters. The bulkhead is disposed in a plane substantially normal to the arms and supports a container. The container includes a lower holder having a transverse partition which extends across the width of the container and defines a first and a second compartment within the lower holder. The lower holder further includes an inverted well which houses the bulkhead, the suspension arm, the castor arm and the wheel.

The suspension of the trailer includes a shock absorber and a spring which reacts between the suspension arm of a spring mounting plate. A preload bolt extends between the suspension arm and the spring mounting plate to enable adjustment of the suspension arm in accordance with the weight of the contents of the container. A damper is provided between the castor arm and the suspension arm to moderate relative swivelling between the suspension arm and the castor arm. An access lid permits inspection of the suspension from within the container and the castor arm includes a lock for locking the castor arm relative to the suspension arm to permit rearward maneuvering of the trailer and motorcycle combination.

The foregoing has outlined rather broadly the more pertinent and important features of the present invention in order that the detailed description of the invention that follows may be better understood so that the present contribution to the art can be more fully appreciated. Additionally, features of the invention will be disclosed or described hereinafter which form the subject of the claims of the invention. It should be appreciated by those skilled in the art that the conception and specific embodiment disclosed may be readily utilized as a basis for modifying or designing other devices for carrying out the same purposes as the present invention. It should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following description taken in conjunction with the accompanying drawings in which:

FIG. 1 is a plan view of the one wheel trailer of the present invention;

FIG. 2 is a sectional view taken on the line 2—2 of FIG. 1;

FIG. 3 is a view partially in section taken on the line 3—3 of FIG. 1;

FIG. 4 is a sectional view of the container of the trailer as shown in FIG. 3 with the top portion and intermediate holder opened for access to the lower holder;

FIG. 5 is a partial sectional view of the lower holder taken on the line 3—3 of FIG. 1 showing the trailer suspension;

FIG. 6 is a sectional view taken on the line 6—6 of FIG. 5;

FIG. 7 is a sectional view taken on the line 7—7 of FIG. 6;

FIG. 8 is a longitudinal cross-sectional view of one embodiment of the ball and socket connection between a trailer arm and a footpeg.

FIG. 9 is a plan view of a preferred embodiment of the ball and socket connection between the trailer arm and the motorcycle.

FIG. 10 is a fragmentary side elevational view of the trailer arm shown in FIG. 9;

FIG. 11 is a plan view of the ball fittment shown in FIG. 9 detached from the trailer arm;

FIG. 12 is a plan view of a typical footpeg which is replaced by the socket connection shown in FIG. 9;

FIG. 13 is a side elevational view of a ride-off stand shown in FIGS. 9 and 10;

FIG. 14 is a plan view of the trailer arm shown in FIG. 9 together with adjacent bracket and adjustable means;

FIG. 15 is a side elevational view of the adjustable means shown in FIG. 14;

FIG. 16 is a side elevational view of the trailer arm as shown in FIG. 9 together with a bracket;

FIG. 17 is a fragmentary plan view of the trailer and bracket as shown in FIG. 16;

FIG. 18 is a side elevational view of an additional support and anchor plate;

FIG. 19 is a side elevational view of the anchor plate shown in FIG. 18;

FIG. 20 is a side elevational view of the bracket shown in FIG. 14;

FIG. 21 is an exploded side elevational view of a castor arm;

FIG. 22 is a sectional view taken on the line 22—22 of FIG. 21;

FIG. 23 is an elevational view of a locking rod for locking the caster on; and

FIG. 24 is a plan view of the cast arm shown in FIG. 21.

Similar reference characters refer to similar parts throughout the several views of the drawings.

DETAILED DESCRIPTION

FIG. 1 is a plan view of a one wheel trailer for a motorcycle. The trailer or load carrying device is generally designated 10. The trailer 10 includes a first and a second arm 12 and 14, respectively. Each of the arms 12 and 14 has a first end 16 and 18, respectively. The first end 16 of the first arm 12 includes a first inwardly turned ball 20 which cooperates with a first socket 22 defined by the distal end 24 of the passenger footpeg 26 as shown in FIG. 8. Similarly, the first end 18 of the second arm 14 includes a second ball 28 which is inwardly turned towards the first ball 20. The second ball 28 is receivably engaged by a second and cooperating socket 30, defined by the distal end 32 of a further passenger footpeg 34 disposed adjacent the opposite side of the motorcycle.

With particular reference to FIGS. 1 and 3, ride-off stands 36 and 38 are pivotally secured relative the arms 12 and 14, respectively. The stands 36 and 38 provide lateral stability to the motorcycle and trailer combination when stationary, but are pivotally movable to a stowable disposition adjacent the arms 12 and 14 when the trailer is being towed.

The arms 12 and 14 further include second or distal ends 40 and 42, respectively, fixedly secured to a bulkhead or frame plate 44. Alternatively, as shown in FIG. 1, the ends 40 and 42 are secured to inwardly directed brackets 46 and 48, respectively, and the brackets 46 and 48 are secured to the bulkhead 44. Adjustable means such as turnbuckles 50 and 52 extend between the arm 12 and brackets 46 and between arm 14 and bracket 48, respectively. By adjusting the turnbuckles 50 and 52, the angular disposition of the arms 12 and 14, relative to the bulkhead 44 can be altered. Such angular movement of the arms 12 and 14 permits engagement or disengagement of the balls 20, 28 with sockets 22, 30, respectively. Alternatively, instead of turnbuckles, a threaded rod and cooperating nut may be provided with means for rapidly moving the nut along the length of the threaded rod and clamping the same to the rod at approximately the correct location. With the nut in the correct location, the nut is then rotated to provide fine adjustment of the relative disposition of the respective arms 12 and 14.

FIG. 3 shows additional supports 54 and 56 which are angularly disposed relative to the arms 12 and 14, respectively. Support 54 extends between arms 12 and an anchor plate 58 secured to the bulkhead 44. Similarly, support 56 extends between arm 14 and an anchor plate 60, also secured to the bulkhead 44.

The bulkhead or frame plate 44 is disposed substantially normal to the longitudinal axis of the arms 12 and 14, respectively, and extends between the same. The bulkhead 44 supports a container or closable load carrying box, generally designated 62, which may be fabricated from fiberglass or the like.

Container 62 includes a lower holder 64 having a transverse partition 66 which extends across the width of the lower holder 64. The lower holder 64 further includes an inverted well or wheel compartment 68 having an access lid 70 for gaining access to the wheel and trailer suspension. In one embodiment of the present invention, the transverse partition 66 divides the lower holder into a first and a second compartment, 72 and 74, respectively.

As shown more particularly in FIG. 3, the container 62 further includes an intermediate holder 76 having a base 78 and a wall 80 which, when the container is closed, is disposed angularly relative to the partition 66.

A top portion generally designated 82 includes a closure 84 which, when the container 62 is closed, is disposed substantially parallel to the wall 80 of the intermediate holder 76. The closure 84 is hingedly secured to the top edge of the rear end of the lower holder 64 by means of lower hinges 86. A cap 88 is hinged to the top edge of the closure 84 by upper hinges 90 and the front edge of the cap 88 is releasably secured to the top edge of the intermediate holder 76 by clasps 92.

With reference to FIG. 3, a first garment holder 94 is secured to a hook 96 disposed on the inner surface of the cap 88. When the cap 88 and closure 84 are pivoted to the open configuration as shown in FIG. 4, the first garment holder 94 is partially lifted out of the container thus providing ease of access to other luggage contained therein.

A second garment holder 98 is secured to a second hook 100 disposed adjacent the inner surface of the cap 88. When the closure and the cap 88 are opened as shown in FIG. 4, the second garment holder 98 is partially lifted from the container enabling the contents to be easily accessed.

In addition to the clasp 92 which releasably connects the cap and intermediate holder, a further clasp 102 is disposed between the intermediate holder and the lower holder 64 to releasably secure the same together.

Referring more particularly to FIGS. 5 and 6, a suspension arm or plate 104 is pivotally secured to the bulkhead 44. A first and a second coil spring 106 and 108, respectively, extend between the suspension arm 104 and a spring mounting plate 110 which is rigidly secured to the bulkhead 44. A shock absorber 112 is disposed within the coil of coil spring 106 to moderate oscillation between the suspension arm 104 and the spring mounting plate 110 during towing of the trailer. A threaded preload bolt 114 extends between the suspension arm 104 and the mounting plate 110. Rotation of the preload bolt 114 provides adjustable compensation in accordance with the load bearing requirement of the trailer.

A castor arm 116 is mounted adjacent the distal end of the suspension arm 104 and is free to swivel relatively thereto. A wheel 118 is rotatably mounted on the castor arm 116 and a damper 120 extends between the castor arm 116 and the suspension arm 104 to dampen undue swivelling of castor arm 116 relative to the suspension arm 104.

Means are provided adjacent the castor arm 116 to lock the same relative to the suspension arm 104 when rearward maneuvering of the motorcycle and trailer combination is required.

FIG. 9 shows a preferred embodiment of the ball and socket connection between a trailer arm 12A and a motorcycle (not shown). Arm 12A is of rectangular tubular configuration and includes a telescopic arm 13A which slidably engages the bore of arm 12A. A bolt 15A threadably engages a wedge nut 17A to lockingly secure the telescopic arm 13A within the trailer arm 12A at the required axial disposition of the trailer to permit adequate clearance between the front of the trailer container and the rear wheel of the motorcycle.

The telescopic arm 13A includes a lateral extension 19A which defines a recess 21A at the distal end thereof. Recess 21A cooperates with a ball fitment 23A which includes a ball 20A. Ball 20A fits within a socket 22A defined by adapter 25A. The adapter 25A is permanently secured to the motorcycle by means of a threaded bore and cooperating nut (not shown). The adapter 25A is located at the site of the passenger footpeg and permits the receiption of either a passenger footpeg therein or the ball 20A of the trailer.

FIG. 11 shows a ball fitment 23A together with a transverse bore for location of fitment 23A within the recess 21A.

FIG. 12 shows a typical footpeg with means for locating the proximal end thereof within the socket 22A of the adapter 25A.

FIG. 13 is a side elevational view of a ride-off stand 36A. The stand 36A is pivotably connected to the trailer arm 12A by a saddle bracket 27A and cooperating pivot pin 29A shown more particularly in FIGS. 9 and 10. As shown in FIG. 13, the stand 36A includes an extendible leg 31A which is adjustably secured within the stand 36A. Laterally extending lugs 33A and 35A extend respectively from the saddle bracket 27A and the distal end of the stand 36A. A torsion spring 37A extends between lugs 33A and 35A to to fold the stand 36A adjacent the trailer arm 12A. In use of the stand 36A, the stand is tilted downwardly about pin 29A against action of the spring 37A. In the downward disposition the stand 36A supports both the trailer and the motorcycle.

FIG. 14 is a plan view of the trailer arm 12A and inwardly turned bracket 46A and adjustable means or turnbuckles generally designated 50A. The adjustable means 50A includes a hollow elongate member 39A pivotably connected to the trailer arm 12A. A first pivot pin 41A extends transversely across the distal end of the member 39A and pivotably supports a first end of a clevis 43A. A second pivot pin 45A, shown more particularly in FIG. 15, extends transversely between respective arms of the clevis 43A and through a block 47A pivotably supported by the second pivot pin 45A and disposed between the respective arms of the clevis 43A approximately midway along the length of the clevis 43A. A threaded rod 49A slidably extends through a bore defined by the block 47A with the bore being disposed transversely relative to the second pivot pin 45A. A nut 51A threadably engages a first end of the rod 49A to adjust the axial disposition of the rod 49A relative to the block 47A. A hook 53A is disposed at a second end of the rod 49A for engagement with the end of the bracket 46A remote from the trailer arm 12A. A locking pin 55A extends transversely through the member 39A midway along the length thereof and through a transverse bore defined by a second end of the clevis 43A to lock the second end of the clevis 43A relative to the member 39A.

In operation of the adjustable means, the locking pin 55A is removed and the second end of the clevis 43A is pulled outwardly so that the clevis 43A pivots about pin 41A. Tension between the threaded rod 49A and the bracket 46A is thus released and the hook 53 may be disengaged from the bracket 46A. By rotating the nut 51A relative to the threaded rod 49A, the required adjustment can be carried out in order to obtain the correct relative disposition between the bore 20A and cooperating socket 22A. When the required adjustment to the nut 51A is completed, the clevis 43A is pivoted towards the member 39A and the threaded rod 49A and hook 53A engage the bracket 46A to hold the trailer arm 12A at the correct angle relative the bracket 46A. The locking pin 55A is replaced to lock the adjustable means in the adjusted disposition.

FIG. 16 is a side elevational view of trailer arm 12A showing the connection between the arm 12A and inwardly turned bracket 46A. FIG. 17 is a plan view of the connection shown in FIG. 16. FIG. 18 is a side elevational view showing the additional support 54A which extends between the arm 12A and the anchor plate 58A. FIG. 19 shows the anchor plate 58A in more detail together with the plurality of transverse apertures spaced along the length of the anchor plate 58A to permit an adjustment in the location of the support 54A relative to the container.

FIG. 20 shows the bracket 46A together with the plurality of transverse apertures spaced along the length thereof to permit adjustable location of the bracket 46A relative to the trailer container. Such adjustment increases the ease with which the trailer can be fitted to a plurality of different motorcycles of varying dimensional widths.

FIG. 21 shows a preferred embodiment of the caster arm generally designated 116A. Caster arm 116A includes an upstanding post 57A which cooperates with and extends through the suspension arm. The post 57A is pivotably mounted relative to the suspension arm by suitable bearing means (not shown). The post 57A is secured within the suspension arm by a nut and washer generally designated 59A and shown in the exploded view in plan and side elevation, respectively. The caster arm further includes a wheel supporting portion 61A which in turn, rigidly supports axle 63A for rotatably supporting the wheel.

FIG. 22, which is a section taken on the line 22—22 of FIG. 21, shows at the lower end of the wheel supporting portion 61A, a pivoted tube 65A.

In use of the trailer, the pivoted tube 65A pivots downwardly. However, when the motorcycle and trailer combination are to be maneuvered rearwardly, the caster arm 116A must be locked against undesirable swiveling of the same. A locking rod 67A, shown in FIG. 23, is inserted into the bore of the tube 65A and the opposite end of the locking rod 67A is locked by a suitable pin to a clevis 69A rigidly secured to the container of the trailer.

The one wheel trailer of the present invention not only provides a trailer of outstanding cornering capabilities, but also a trailer that affords ease of access to the contents thereof and a simple and inexpensive means for coupling the trailer to a motorcycle or the like.

The present disclosure includes that contained in the appended claims as well as that of the foregoing description. Although the invention has been described in its preferred form with a certain degree of particularity, it is understood that the present invention of the preferred form has been made only by way of example, that numerous changes in the details of construction and the combination and arrangement of parts may be resorted to without departing from the spirit and scope of the invention.

What is claimed is:

1. A one wheel trailer for a two-wheeled vehicle comprising in combination:
 a first and a second arm, each of said arms including a first and a second end, said first end of said first arm being connected one side of the two wheeled vehicle, said first end of said second arm being connected to the opposite side of the two wheeled vehicle;
 a frame plate rigidly secured adjacent said second end of each of said arms;

a container disposed adjacent said frame plate and supported thereby;

a biased suspension plate pivotally connected to said frame plate;

a caster arm swivelably mounted relative to the distal end of said suspension plate;

a damper extending between said caster arm and said suspension plate for moderating the swivelling of said caster arm relative to said suspension plate; and a wheel rotatably mounted relative to said caster arm enabling said wheel to support said container.

2. A one wheel trailer for a two-wheel vehicle comprising in combination:

a first and a second arm, each of said arms including a first and a second end, said first end of said first arm being connected to one side of the two wheeled vehicle, said first end of said second arm being connected to the opposite side of the two wheeled vehicle;

said first end of each of said first and second arms includes a ball receivably engaged within a cooperating socket defined by the distal end of an adapter secured at the site of a motorcycle footpeg;

a frame plate rigidly secured adjacent said second end of each of said arms;

a container disposed adjacent said frame plate and supported thereby;

a biased suspension plate pivotally connected to said frame plate;

a caster arm swivelably mounted relative to the distal end of said suspension plate; and a wheel rotatably mounted relative to said caster arm enabling said wheel to support said container.

3. A trailer as set forth in claim 2 wherein said adapter is secured at the site of a passenger footpeg of a motorcycle.

4. A trailer as set forth in claim 1 wherein said arms each include a stowable stand.

5. A trailer as set forth in claim 4, wherein said stand is a ride-off stand which equally supports the motorcycle and trailer combination when parked and supports the trailer when disconnected from the motorcycle.

6. A trailer as set forth in claim 1 wherein said bulkhead is disposed in a plane substantially normal to said arms.

7. A trailer as set forth in claim 1 wherein said container includes a lower holder, including a transverse partition extending across the width of said container, said partition defining a first and a second compartment within said lower holder.

8. A trailer as set forth in claim 7 wherein said lower holder includes an inverted well which houses said bulkhead, said suspension plate, said castor arm and said wheel.

9. A trailer as set forth in claim 1 wherein said biased suspension plate is biased by a coil spring and cooperating shock absorber, said coil spring and cooperating shock absorber extending between the distal end of a spring mounting plate and said suspension plate, said spring mounting plate being cantilevered relative to said bulkhead.

10. A one wheel trailer for a two-wheeled vehicle comprising in combination:

a first and a second arm, each of said arms including a first and second end, said first end of said first arm being connected to one side of the two-wheeled vehicle, said first end of said second arm being connected to the opposite side of the two-wheeled vehicle;

means for adjusting the relative disposition of said first end of each of said arms relative the two-wheeled vehicle;

a frame plate rigidly secured adjacent said second end of each of said arms;

a container disposed adjacent said frame plate and supported thereby;

a biased suspension plate pivotally connected to said frame plate;

a caster arm swivelably mounted relative to the distal end of said suspension plate; and a wheel rotatably mounted relative to said caster arm enabling said wheel to support said container.

11. A trailer as set forth in claim 10 wherein said adjustable means includes a pivotably mounted clevis and cooperating threaded rod extending between one of said arms and said bulkhead.

12. A one wheel trailer for a two-wheeled vehicle comprising in combination:

a first and a second arm, each of said arms including a first and a second end, said first end of said first arm being connected to one side of the two-wheeled vehicle, said first end of said second arm being connected to the opposite side of the two-wheeled vehicle;

a frame plate rigidly secured adjacent said second end of each of said arms;

a container disposed adjacent said frame plate and supported thereby;

a lower holder of said container including a transverse partition extending across the width of said container, said partition defining a first and a second compartment within said lower holder, said lower holder including an inverted well which houses said frame plate, said container further includes an intermediate holder comprising a base disposed adjacent said inverted well and a wall which extends angularly to said transverse partition;

a bias suspension plate pivotally connected to said frame plate;

a caster arm swivelably mounted relative to the distal end of said suspension plate;

a wheel rotatably mounted relative to said caster arm enabling said wheel to support said container; and said inverted well housing, said suspension plate, said caster arm and said wheel.

13. A trailer as set forth in claim 12 wherein said container further includes a top portion comprising a closure hingedly secured to said lower holder and extending substantially parallel to said wall.

14. A trailer as set forth in claim 13 wherein said top portion additionally includes a cap having a first and a second edge, said first edge being hingedly secured to a side of said closure remote from said lower holder, said second edge being fastened relative said lower holder via said intermediate holder.

15. A trailer as set forth in claim 14 wherein said cap further includes a first and a second hook disposed adjacent on the internal surface of said cap, said first hook being connected to a first garment holder disposed within said first compartment defined by said partition, said wall and said closure, respectively, said second hook being connected to a second garment holder disposed within said intermediate holder, said hooks enabling partial lifting of said garment holders relative to said container.

16. A one wheel trailer for a two-wheeled vehicle comprising in combination:
a first and second arm, each of said arms including a first and a second end, said first end of said first arm being connected to one side of a two-wheeled vehicle, said first end of said second arm being connected to the opposite side of the two-wheeled vehicle;
a frame plate rigidly secured adjacent said second end of each of said arms;
a container disposed adjacent said frame plate and supported thereby;
a biased suspension plate pivotally connected to said frame plate, said biased suspension plate being biased by a coil spring and a cooperating shock absorber, said coil spring and cooperating shock absorber extending between the distal end of a spring mounting plate and said suspension plate, said spring mounting plate being cantilevered relative to said frame plate;
a caster arm swivelably mounted relative to the distal end of said suspension plate;
a wheel rotatably mounted relative to said caster arm enabling said wheel to support said container; and
said spring and cooperating shock absorber are connected to said suspension arm between said pivotal connection and said swivelable caster arm.

17. A one wheel trailer for a two-wheeled vehicle comprising in combination:
a first and a second arm, each of said arms including a first and a second end, said first end of said first arm being connected to one side of the two-wheeled vehicle, said first end of said second are being connected to the opposite side of the two-wheeled vehicle;
a frame plate rigidly secured adjacent said second end of each of said arms;
a container disposed adjacent said frame plate and supported thereby;
a biased suspension plate pivotally connected to said frame plate;
a caster arm swivelably mounted relative to the distal end of said suspension plate;
a wheel rotatably mounted relative to said caster arm enabling said wheel to support said container;
said biased suspension plate being biased by a coil spring and cooperating shock absorber, said coil spring and said cooperating shock absorber extending between the distal end of a spring mounting plate and said suspension plate, said spring mounting plate being cantilevered relative to said frame plate; and
a pre-load bolt extends between said suspension plate and said spring mounting plate enabling adjustment of said suspension arm in accordance with said contents of said container.

18. A trailer as set forth in claim 17 wherein said container includes an access lid enabling adjustment of said preload bolt from within said container.

19. A load carrying device for attachment to a motorcycle comprising in combination:
a first and a second arm extending from opposite passenger footpegs of said motorcycle;
said arms being substantially parallel relative each other;
a frame plate rigidly secured to a distal end of each of said arms, said frame plate being disposed in a plane substantially normal to the longitudinal axis of said arms;
a closable load carrying box rigidly secured to said frame plate, said box including a wheel compartment;
a suspension plate pivotally mounted relative to said frame plate about an axis disposed in a plane parallel to the common plane of said arms;
a biasing means for biasing said suspension plate, said biasing means extending between said suspension plate and said frame plate;
a shock absorber cooperating with said biasing means for dampening relative movement between said suspension plate and said frame plate;
a preload means extending between said suspension plate and said frame plate enabling adjustment of the distance between said suspension plate and said frame plate to accommodate the various loads carried by the carrying device;
a castor arm rotatably mounted adjacent a distal end of said suspension plate enabling said castor arm to swivel relative said suspension plate about an axis normal to the plane of said suspension plate; and
a wheel rotatably secured to said castor arm enabling said wheel to support said load carrying box.

20. A load carrying device for attachment to a motorcycle comprising in combination:
a first and a second arm extending from opposite passenger footpegs of said motorcycle;
said arms being substantially parallel relative each other;
a stand stowably secured to each of said arms;
a frame plate rigidly secured to a distal end of each of said arms, said frame plate being disposed in a plane substantially normal to the longitudinal axis of said arms;
a closable load carrying box rigidly secured to said frame plate, said box including a wheel compartment;
a suspension plate pivotally mounted relative to said frame plate about an axis disposed in a plane parallel to the common plane of said arms;
a biasing means for biasing said suspension plate, said biasing means extending between said suspension plate and said frame plate;
a shock absorber cooperating with said biasing means for dampening relative movement between said suspension plate and said frame plate;
a preload means extending between said suspension plate and said frame plate enabling adjustment of the distance between said suspension plate and said frame plate to accommodate the various loads carried by the carrying device;
a castor arm rotatably mounted adjacent a distal end of said suspension plate enabling said castor arm to swivel relative said suspension plate about an axis normal to the plane of said suspension plate;
a damper extending between said castor arm and said suspension plate for moderating movement between said castor arm and said suspension plate; and
a wheel rotatably secured to said castor arm enabling said wheel to support said load carrying box.

* * * * *